(12) United States Patent
Apte et al.

(10) Patent No.: US 6,776,941 B2
(45) Date of Patent: Aug. 17, 2004

(54) COLD ISOPRESSING METHOD AND MOLD

(75) Inventors: Prasad S. Apte, East Amherst, NY (US); Shawn W. Callahan, Tonawanda, NY (US); James S. Schneider, Akron, NY (US); Jack C. Chen, Getzville, NY (US)

(73) Assignee: Praxair Technology, Inc., Danbury, CT (US)

( * ) Notice: Subject to any disclaimer, the term of this patent is extended or adjusted under 35 U.S.C. 154(b) by 280 days.

(21) Appl. No.: 10/162,632

(22) Filed: Jun. 6, 2002

(65) Prior Publication Data

US 2003/0006537 A1 Jan. 9, 2003

Related U.S. Application Data

(63) Continuation-in-part of application No. 09/668,728, filed on Sep. 22, 2000, now abandoned.

(51) Int. Cl.[7] .............................................. B29C 43/10
(52) U.S. Cl. .................... 264/71; 264/544; 264/570; 264/109; 425/405.2
(58) Field of Search ................................ 264/628, 632, 264/71, 544, 570, 109, 123; 425/405.2

(56) References Cited

U.S. PATENT DOCUMENTS

| | | | | |
|---|---|---|---|---|
| 2,152,738 A | * | 4/1939 | Jeffery ......................... | 264/313 |
| 3,034,191 A | * | 5/1962 | Schaefer et al. .............. | 425/78 |
| 3,502,755 A | | 3/1970 | Murray ......................... | 264/56 |
| 3,505,158 A | | 4/1970 | Murray ......................... | 161/110 |
| 4,486,385 A | | 12/1984 | Aslund ......................... | 419/48 |
| 4,514,158 A | | 4/1985 | Pettersson .................... | 425/78 |
| 4,541,975 A | | 9/1985 | Honma et al. ................ | 264/62 |
| 4,571,312 A | | 2/1986 | Greskovich et al. ......... | 264/1.2 |
| 4,997,604 A | | 3/1991 | Hofer et al. .................. | 264/65 |
| 5,019,330 A | | 5/1991 | Bewlay et al. ................ | 419/39 |
| 5,173,229 A | | 12/1992 | Miyamoto .................... | 264/59 |
| 5,417,917 A | | 5/1995 | Takahar et al. ............... | 419/2 |
| 5,599,383 A | | 2/1997 | Dyer et al. .................... | 96/8 |
| 5,603,876 A | | 2/1997 | Honma et al. ................ | 264/65 |
| 5,631,029 A | | 5/1997 | Bewlay et al. ................ | 425/78 |
| 5,665,291 A | | 9/1997 | Honma et al. ................ | 264/666 |
| 5,735,985 A | | 4/1998 | Ghosh et al. ................. | 156/89 |
| RE36,249 E | | 7/1999 | Zeller ........................... | 55/523 |
| 6,004,126 A | * | 12/1999 | Strobel ......................... | 425/405.2 |

* cited by examiner

*Primary Examiner*—Mary Lynn Theisen
(74) *Attorney, Agent, or Firm*—David M. Rosenblum

(57) ABSTRACT

A cold isopressing method and mold for compacting a granular ceramic material in which the granular ceramic material is introduced into a cylindrical pressure bearing element of an isopressing mold. The cylindrical pressure bearing element is sufficiently rigid so as to maintain its shape during the introducing of the granular ceramic material. Such element is also sufficiently resilient in a radial direction thereof to deform and bear against the granular ceramic material upon the application of the hydrostatic pressure and to substantially return to its original shape upon the relaxation of the hydrostatic pressure, thereby to allow retraction of the cylindrical pressure bearing element from the granular ceramic material after compaction. In a further aspect, an isopressing method and mold is provided in which the cylindrical pressure bearing element thereof is provided with an enlarged end bore to form an enlarged end section in the finished ceramic tube for sealing purposes.

23 Claims, 2 Drawing Sheets

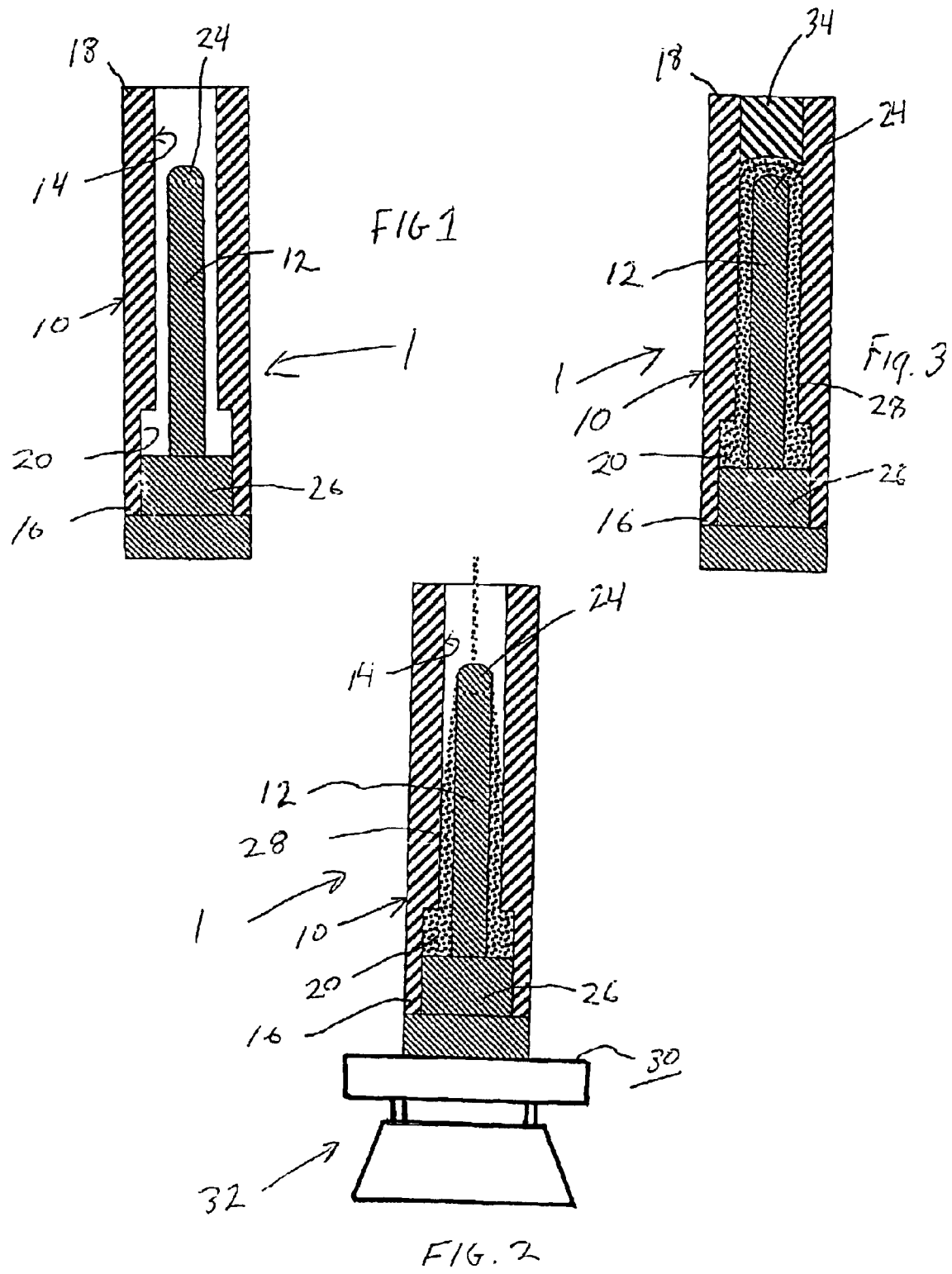

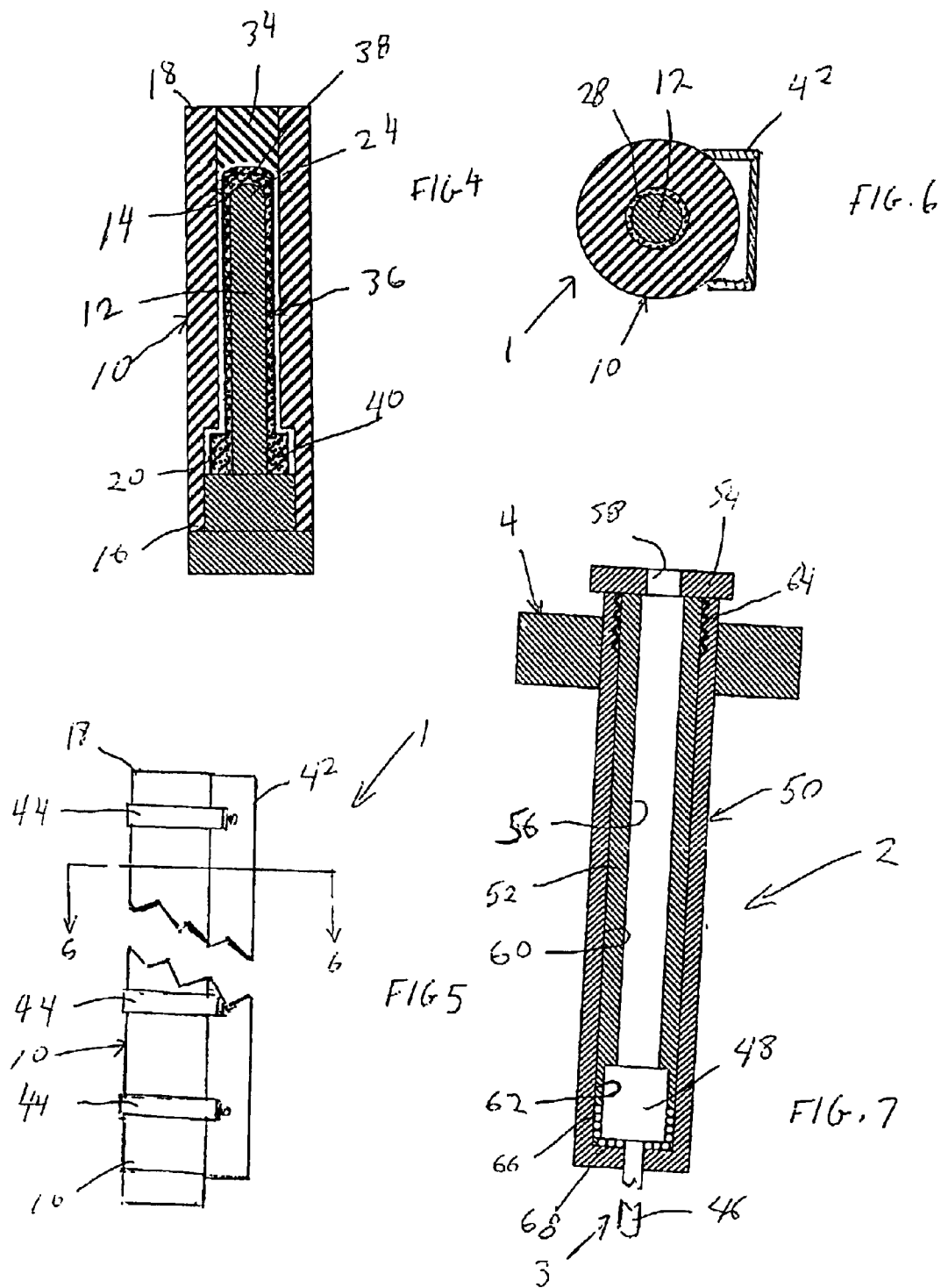

COLD ISOPRESSING METHOD AND MOLD

This application is a continuation-in-part of Ser. No. 09/668,728 filed Sep. 22, 2000 now abandoned.

FIELD OF THE INVENTION

The present invention relates to a cold isopressing method and mold for compacting a granular ceramic material for use in manufacturing ceramic tubes. More particularly, the present invention relates to such a method and mold in which the ceramic tubes are useful in forming ceramic membrane elements of the type exhibiting infinite hydrogen or oxygen selectivity. In other aspects, the present invention relates to a cold isopressing method and mold in which ceramic tubes are formed having enlarged end portions that are more amenable to sealing than prior art ceramic tubes.

BACKGROUND OF THE INVENTION

Ceramic tubes have many industrial uses, for instance, insulators, filters, etc. An important recent use involves the employment of such tubes in membrane modules to separate oxygen or hydrogen from a gas stream. The ceramic tubes used in membrane separation applications are manufactured from materials that exhibit infinite oxygen or hydrogen selectivity at high temperatures. In an oxygen-selective membrane, oxygen is ionized at one surface of the membrane to form oxygen ions. The oxygen ions travel through the membrane to the opposite surface thereof where the oxygen ions recombine to form elemental oxygen. In forming the elemental oxygen, electrons are given up from the ions. Depending upon the type of material used in fabricating the membrane, the electrons either flow through the membrane material itself or through separate conductive pathways to initially ionize the oxygen.

The traditional method fabricating ceramic tubes involves processes such as slip casting or extrusion. The use of extrusion to form solid-state membrane modules is disclosed in U.S. Pat. No. 5,599,383.

Another known method of fabricating ceramic tubes is isopressing. In cold isopressing, a tubular mold is utilized that is formed from a soft neoprene rubber. This mold, known as a bag, is used in conjunction with a mandrel that projects into the bag. The bag is filled with a ceramic material in granular form. The mold is subjected to a hydrostatic pressure within a vessel containing cold or warm water that is sufficient to compact the ceramic material into a green ceramic tube. After compaction, the hydrostatic pressure is relaxed and the green ceramic form is removed from the mold. In this regard, the mandrel is provided with a slight taper to permit separation of the green ceramic tube from the mandrel. The green ceramic tube can then be heated to burn out organic binder materials and the like and to sinter the ceramic.

The prior art method of isopressing has found application in the manufacture of short thick tubes. When longer tubes are attempted by this method, defects are found in the fired and sintered tubes. The reason for such defects is that it is impossible to introduce ceramic powder into the mold so that the powder is uniformly distributed. For instance, if there exists a slight wrinkle in the mold, the powder will tend to hang up on the wrinkle to produce a defect in the finished ceramic tube.

As will be discussed, the present invention in one aspect provides a cold isopressing method and mold that is particularly applicable to forming long thin, ceramic tubes that can be used in ceramic membrane applications. As will also be discussed, other aspects of the present invention are particularly useful in the fabrication of ceramic tubes having end configurations that are more amenable to sealing than prior art sealing methods.

SUMMARY OF THE INVENTION

The present invention provides a cold isopressing method for compacting a granular ceramic material. As used herein and in the claims, the term "granular ceramic material" means ceramic powder or a mixture comprising a ceramic powder, an organic binder and a plasticizing agent. In accordance with such method, the granular ceramic material is introduced into an isopressing mold having a cylindrical pressure bearing element and at least one mandrel located within the cylindrical pressure bearing element. After the cylindrical pressure bearing element is sealed, the cylindrical pressure bearing element is subjected to a hydrostatic pressure to compact the granular ceramic material. The hydrostatic pressure is relaxed after such compaction. The cylindrical pressure bearing element is sufficiently rigid so as to maintain its shape during the introducing of the granular ceramic material and is also sufficiently resilient in a radial direction thereof to deform and bear against the granular ceramic material upon the application of the hydrostatic pressure and to at least substantially return to its original shape upon the relaxation of the hydrostatic pressure.

The resiliency of the cylindrical pressure bearing element allows retraction of the cylindrical pressure bearing element from the granular ceramic material after compaction. In this regard, the use of the term, "at least substantially" with respect to the return of the cylindrical pressure bearing element to its original shape admits to the possibility that after relaxation of hydrostatic pressure, the cylindrical pressure bearing element might be slightly out of round. However, such cylindrical pressure bearing element should not be so out of round that the mold is unable to completely retract from the granular ceramic material.

As may be appreciated, the provision of a cylindrical pressure bearing element that will maintain its shape during filling allows for long thin tubes to be fabricated with the ceramic material having a uniform density along the length of the tube. Gross maldistributions of ceramic material that are caused by the wrinkling of the cylindrical pressure bearing element during filling are eliminated. Moreover, the resiliency of the cylindrical pressure bearing element ensures a clean separation of the mold from the compacted ceramic material to also prevent tube defects.

The at least one mandrel can be a single mandrel to produce a tube-like structure. Alternatively, multiple, parallel mandrels can be used to form a cylindrical structure having internal passageways. Both types of structures, the tube or the cylindrical structure having internal passageways would be useful in forming ceramic membrane elements.

The at least one mandrel can be connected to an enlarged base element that projects into one end of the cylindrical pressure bearing element, thereby to seal the cylindrical pressure bearing element at the one end. The granular ceramic material is introduced into the isopressing mold through the other end of the cylindrical pressure bearing element during filling. A removable end plug is positioned within the other end of the cylindrical pressure bearing element to seal such other end thereof. In this regard, the term "removable" as used herein and in the claims means that such end plug can be removed and is not permanently bonded attached to the cylindrical pressure bearing element.

One end of the cylindrical pressure bearing element can be provided with an enlarged, axial end bore positioned so that the compacted granular ceramic material has an enlarged end section. As will be discussed, such an enlarged end section can be used in a sealing arrangement at the connection of a finished ceramic tube to a tubesheet.

Preferably, the isopressing mold is vibrated while the granular ceramic material is introduced into the isopressing mold. The vibrations act on the cylindrical pressure bearing element member to help fill the mold and ensure that there is no hang up of the granular ceramic material within the mold. Such transmission of vibrations is possible due to the rigidity of a cylindrical pressure bearing element in accordance with the present invention as opposed to a soft rubber bag of the prior art. As may be appreciated, the use of such a vibration technique during filling is particularly important in the fabrication of long, thin tubes.

In case of a single mandrel, the cylindrical pressure bearing element can advantageously be sized such that the granular ceramic material prior to compaction occupies an annular space having a wall thickness no less than about twice that of the granular ceramic material after compaction.

In granular ceramic materials containing a binder, the binder can comprise no more than about 5% by weight of the granular ceramic material. This is to be contrasted with ceramic tubes of the prior art in which binder is 10% or more by weight of the granular ceramic material. The greater the binder content, the greater the time expended in firing and sintering a green ceramic tube formed of compacted, granular ceramic material and also, the greater possibility of tube defects.

As stated above, the present invention is particularly applicable to forming membrane units for separating oxygen and hydrogen. As such, the granular ceramic material can be the type that is a capable of conducting one of oxygen ions and hydrogen ions. These membrane elements are preferably in the form of long thin tubes. However, the formation of long thin cylindrical elements in accordance with the present invention are possible. In order such manufacture tubes, a cylindrical pressure bearing element can be provided with a length of no less than about 60 millimeters and a diameter such that the granular ceramic material prior to compaction occupies an annular space having a radial thickness of no more than about 4 millimeters. Unlike the prior art, the single mandrel used in a mold to form a tube need not be tapered and can be of cylindrical configuration.

In another aspect, the present invention provides an isopressing mold for compacting a granular ceramic material. The isopressing mold can be provided with a cylindrical pressure bearing element and at least one mandrel located within the cylindrical pressure bearing element. If tubes are to be formed, the at least one mandrel can be a single mandrel. The cylindrical pressure bearing element is sufficiently rigid so as to maintain its shape upon introduction of the granular ceramic material into the cylindrical pressure bearing element and is also sufficiently resilient in a radial direction thereof to deform and bear against the granular ceramic material upon an application of a hydrostatic pressure and to at least substantially return to its original shape upon the relaxation of the hydrostatic pressure. As stated above, this allows the cylindrical pressure bearing element to retract from the granular ceramic material after compaction thereof by the hydrostatic pressure. A means is provided for sealing the cylindrical pressure bearing element at opposite ends thereof.

Preferably, the sealing means comprise an enlarged base element connected to the at least one mandrel and positioned within one end of the cylindrical pressure bearing element, thereby to seal the cylindrical pressure bearing element at the one end thereof. A removable end plug is positioned within said other end of said cylindrical pressure bearing element to seal such other end.

One end of the cylindrical pressure bearing element can be provided with an enlarged, axial end bore positioned so that the granular ceramic material after having been compacted has an enlarged end section. In case of a single mandrel, the cylindrical pressure bearing element can be sized such that the granular ceramic material prior to compaction occupies an annular space having a wall thickness no less than about twice that of the granular ceramic material after compaction.

The isopressing mold can further comprise a rigid support attached to the cylindrical pressure bearing element to ensure that the cylindrical pressure bearing element remains straight during mold filling with the granular ceramic material. Preferably, the material making up the cylindrical pressure bearing element is polyurethane having a hardness of 95A on the durometer scale.

As stated above with respect to a single mandrel embodiment of the present invention, the cylindrical pressure bearing element can advantageously have a length of no less than about 60 millimeters and a diameter such that the granular ceramic material prior to compaction occupies an annular space having a radial thickness of no more than about 4 millimeters.

Unlike isopressing molds of the prior art in which the mandrel is tapered, an embodiment of the present invention employing a single mandrel can employ such mandrel with a cylindrical configuration throughout.

As mentioned previously, short ceramic elements can be readily manufactured by the use of prior art isopressing techniques. Such prior art techniques can be advantageously adapted in accordance with the present invention to produce ceramic tubes having enlarged end sections for sealing purposes. In this regard, further aspects of the present invention involve the manufacture of green ceramic tubular forms having enlarged end sections for sealing purposes.

In one of these further aspect, a cold isopressing method is provided for compacting a granular ceramic material into a green ceramic tubular form having an enlarged end section. In accordance with such method, the granular ceramic material is introduced into an isopressing mold having a cylindrical pressure bearing element and at least one mandrel located within the cylindrical pressure bearing element. If tubes are to be formed then the at least one mandrel can be a single mandrel. The cylindrical pressure bearing element is sealed and subjected to a hydrostatic pressure to compact the granular ceramic material into the green ceramic tubular form. Thereafter, the hydrostatic pressure is released. The cylindrical pressure bearing element has an enlarged end bore to produce the enlarged end section of the green ceramic tubular form.

In another of the further aspects of the present invention, an isopressing mold is provided for compacting a granular ceramic material into a green ceramic tubular form having an enlarged end section. In accordance with such aspect, the isopressing mold comprises a cylindrical pressure bearing element and at least one mandrel (a single mandrel if tubes are to be formed) located within the cylindrical pressure bearing element. The cylindrical pressure bearing element has an enlarged end bore to produce the enlarged end section within the green ceramic tubular form. A means is provided for sealing the cylindrical pressure bearing element at opposite ends thereof.

BRIEF DESCRIPTION OF THE DRAWINGS

While the specification concludes with claims distinctly pointing out the subject matter that applicants regard as their invention, it is believed that the invention will be better understood when taken in connection with the accompanying drawings in which:

FIG. 1 illustrates an isopressing mold for carrying out a method of the subject invention prior to mold filling with granular ceramic material;

FIG. 2 illustrates a filling of the isopressing mold of FIG. 1 with the granular ceramic powder;

FIG. 3 illustrates the isopressing mold of FIG. 1 after filling and sealing;

FIG. 4 illustrates the isopressing mold of FIG. 1 after relaxation of hydrostatic pressure;

FIG. 5 illustrates the isopressing mold of FIG. 1 reinforced by a reinforcing rod;

FIG. 6 is a sectional view of FIG. 5 taken along line 6—6 of FIG. 5; and

FIG. 7 illustrates a ceramic tube fabricated in accordance with the present invention in service as a ceramic membrane element.

DETAILED DESCRIPTION

With reference to FIG. 1, a mold 1 in accordance with the present invention is illustrated. Mold 1 is formed of a cylindrical pressure bearing element 10 and a mandrel 12 coaxially located within cylindrical pressure bearing element 10. As will be discussed, ceramic material is compacted between cylindrical pressure bearing element 10 and mandrel 12 to form a green ceramic tubular form that can be finished, by firing and sintering in a known manner, to produce a ceramic tube. Although one mandrel 12 is illustrated, multiple mandrels might be employed to fabricate known cylindrical ceramic structures having multiple internal passageways.

Cylindrical pressure bearing element 10 is of tubular form and is provided with an inner passageway 14 communicating between ends 16 and 18 thereof. Cylindrical pressure bearing element 10 (for purposes to be discussed hereinafter) can be provided with an enlarged end bore 20.

Mandrel 12 acts to form the inside of the finished ceramic tube. The upper end 24 of mandrel 12 is of hemispherical configuration to form a hemispherical inner surface at a closed end of such finished ceramic form. Further, mandrel 12 is preferably of cylindrical configuration without any taper. An enlarged base element 26 can be connected to mandrel 12 for sealing purposes. In this regard, enlarged base element 26 is configured to be positioned into end 16 of cylindrical pressure bearing element 10.

Although not illustrated, mandrel 12 can be textured to increase the surface area on the inner surface of the finished ceramic tube. Further, in the event that a ceramic tube open at both ends were desired, the hemispherical configuration given upper end 24 of mandrel 12 could be deleted.

With reference to FIG. 2, a granular ceramic material 28 is introduced into mold 1 for compaction through end 18 of cylindrical pressure bearing element 10. For example, in case of an oxygen-selective, ion transport membrane element, ceramic material 28 could can be a mixed conducting ceramic capable of conducting oxygen ions and electrons. Examples of such materials are set forth in the following table.

EXAMPLES OF MIXED CONDUCTING SOLID ELECTROLYTES

Material composition

1. $(La_{1-x}Sr_x)(Co_{1-y}Fe_y)O_{3-\delta}$ ($0 \leq y \leq 1$, $\delta$ from stoichiometry)
2. $SrMnO_{3-\delta}$
   $SrMn_{1-x}Co_xO_{3-\delta}$ ($0 \leq x \leq 1$, $\delta$ from stoichiometry)
   $Sr_{1-x}Na_xMnO_{3-\delta}$
3. $BaFe_{0.5}Co_{0.5}YO_3$
   $SrCeO_3$
   $YBa_2Cu_3O_{7-\delta}$ ($0 \leq \delta \leq 1$, $\delta$ from stoichiometry)
4. $La_{0.2}Ba_{0.8}Co_{0.8}Fe_{0.2}O_{2.6}$; $Pr_{0.2}Ba_{0.8}Co_{0.8}Fe_{0.2}O_{2.6}$
5. $A_xA'_{x'}A''_{x''}B_yB'_{y'}B''_{y''}O_{3-z}$
   (x, x', x'', y, y', y'' and z all in 0–1 range)
   where: A, A', A'' = from groups 1, 2, 3 and f-block lanthanides
   B, B', B'' = from d-block transition metals
6. (a) Co—La—Bi type: Cobalt oxide 15–75 mole %
   Lanthanum oxide 13–45 mole %
   Bismuth oxide 17–50 mole %
   (b) Co—Sr—Ce type: Cobalt oxide 15–40 mole %
   Strontium oxide 40–55 mole %
   Cerium oxide 15–40 mole %
   (c) Co—Sr—Bi type: Cobalt oxide 10–40 mole %
   Strontium oxide 5–50 mole %
   Bismuth oxide 35–70 mole %
   (d) Co—La—Ce type: Cobalt oxide 10–40 mole %
   Lanthanum oxide 10–40 mole %
   Cerium oxide 30–70 mole %
   (e) Co—La—Sr—Bi type: Cobalt oxide 15–70 mole %
   Lanthanum oxide 1–40 mole %
   Strontium oxide 1–40 mole %
   Bismuth oxide 25–50 mole %
   (f) Co—La—Sr—Ce type: Cobalt oxide 10–40 mole %
   Lanthanum oxide 1–35 mole %
   Strontium oxide 1–35 mole %
   Cerium oxide 30–70 mole %
7. $Bi_{2-x-y}M'_xM_yO_{3-\delta}$ ($0 \leq x \leq 1$, $0 \leq y \leq 1$, $\delta$ from stoichiometry)
   where: M' = Er, Y, Tm, Yb, Tb, Lu, Nd, Sm, Dy, Sr, Hf, Th, Ta, Nb, Pb, Sn, In, Ca, Sr, La and mixtures thereof
   M = Mn Fe, Co, Ni, Cu and mixtures thereof
8. $BaCe_{1-x}Gd_xO_{3-x}/2$ where,
   x equals from zero to about 1.
9. One of the materials of $A_sA'_tB_uB'_vB''_wO_x$ family whose composition is disclosed in U.S. Pat. No. 5,306,411 (Mazanec et al.) as follows:
   A represents a lanthanide or Y, or a mixture thereof;
   A' represents an alkaline earth metal or a mixture thereof;
   B represents Fe;
   B' represents Cr or Ti, or a mixture thereof;
   B'' represents Mn, Co, V, Ni or Cu, or a mixture thereof;
   and s, t, u, v, w, and x are numbers such that:
   s/t equals from about 0.01 to about 100;
   u equals from about 0.01 to about 1;
   v equals from zero to about 1;
   w equals from zero to about 1;
   x equals a number that satisfies the valences of the A, A', B, B', B'' in the formula; and $0.9 < (s + t)/(u + v + w) < 1.1$
10. One of the materials of $Ce_{1-x}A_xO_{2-\delta}$ family, where:
    A represents a lanthanide, Ru, or Y; or a mixture thereof;
    x equals from zero to about 1;
    y equals from zero to about 1;
    δ equals a number that satisfies the valences of Ce and A in the formula.
11. One of the materials of $Sr_{1-x}Bi_xFeO_{3-\delta}$ family where:
    A represents a lanthanide or Y, or a mixture thereof;
    x equals from zero to about 1;
    y equals from zero to about 1;
    δ equals a number that satisfies the valences of Ce and A in the formula.
12. One of the materials of $Sr_xFe_yCo_zO_w$ family where:
    x equals from zero to about 1;
    y equals from zero to about 1;
    z equals from zero to about 1;
    w equals a number that satisfies the valences of Sr, Fe and Co in the formula.
13. Dual phase mixed conductors (electronic/ionic):
    $(Pd)_{0.5}/(YSZ)_{0.5}$
    $(Pt)_{0.5}/(YSZ)_{0.5}$
    $(B-MgLaCrO_x)_{0.5}(YSZ)_{0.5}$ -continued

EXAMPLES OF MIXED CONDUCTING SOLID ELECTROLYTES

Material composition $(In_{90}\%Pt_{10}\%)_{0.6}/(YSZ)_{0.5}$
$(In_{90}\%Pt_{10}\%)_{0.5}/(YSZ)_{0.5}$
$(In_{95}\%Pr_{2.5}\%Zr_{2.5}\%)_{0.5}/(YSZ)_{0.5}$
Any of the materials described in 1–13, to which a high temperature metallic phase (e.g., Pd, Pt, Ag, Au, Ti, Ta, W) is added.

14. One of the materials of $A_{2-x}A'_xB_{2-y}B'_yO_{5+z}$ family whose composition is disclosed in WO 97/41060 (Schwartz et al.) as follows:
   A represents an alkaline earth metal or a mixture thereof;
   A' represents a lanthanide or Y, or a mixture thereof;
   B represents a metal ion or mixtures of 3d transition metal ions and group 13 metals;
   B' represents a metal ion or mixtures of 3d transition metal ions and group 13 metals, the lanthanides and yttrium;
   $0 < x < 2$; $0 < y < 2$; z renders the compound charge neutral 15. One the matrials of $Ln_xA'_xCo_yFe_{y'}Cu_{y''}O_{3-z}$ family whose composition is disclosed in EP 0 732 305 A1 (Dyer et al.) as follows:
   Ln represents a f block lanthanide;
   A' represents Sr or Ca;
   $x > 0$, $y > 0$, $x + x' = 1$, $y + y' + y'' = 1$, $0 < y \leq 0.4$
   z renders the compound charge neutral 16. One of the materials of $Ln_xA'_xA''_{x''}B_yB'_{y'}B''_{y''}O_{3-z}O_{3-z}$ family whose composition is disclosed in EP 0 931 763 A1 (Dyer et al.) as follows:
   Ln represents a f block lanthanide;
   A' from groups 2;
   A'' from groups 1, 2, 3 and f-block lanthanides
   B, B' from d-block transition metals excluding Ti and Cr
   $0 \leq x < 1$, $0 < x' \leq 1$, $0 < y < 1.1$, $0 \leq y' < 1.1$, $x + x' + x'' = 1.0$, $1.1 > y + y' > 1.0$, z renders the compound charge neutral Unlike prior art techniques in which the binder content is about 10% by weight, the binder content of ceramic material 28 can preferably be about 5% by weight. As stated previously, this reduces processing times in that there is less organic binder to burn out during the firing of the green ceramic tubular form produced by mold 1. This also leads to fewer defects in the finished ceramic tube.

In order to facilitate the introduction of ceramic material 28 into mold 1, mold 1 is rested on a vibrating surface 30 provided by a vibrator 32. Vibrations transmitted through enlarged base portion 26 of mandrel 12 are transmitted to cylindrical pressure bearing element 10. The use of vibrator 32 is particularly preferred when long ceramic tubes are to be formed in that it prevents hang up of ceramic material 28 without the need to resort to tamping and the like.

With reference to FIG. 3, after mold 1 is filled, an end cap 34 is inserted into end 18 of cylindrical pressure bearing element 1. End cap 34 thereby completes the sealing of mold 1. As illustrated, end cap 34 is configured to provide a slight clearance between upper end 24 of mandrel 12 to produce a finished ceramic tube having a closed end. The inner surface of end cap 34 is rounded to round the desired closed end of the ceramic tube. As may be appreciated, end cap 34 could be constructed to touch upper end 24 of mandrel 12 so that the finished ceramic tube were open ended.

Mold 1 in the state shown in FIG. 3 is then immersed in a liquid such as cold or warm water or other liquid capable of transmitting pressure and subjected to hydrostatic pressure. As such, mold 1 is subjected to a cold isopressing process. The exact pressure and time of course will vary with the actual dimensions of mold 1. With additional reference to FIG. 4, after the end of the molding a green ceramic tubular form 36 is produced with a closed end 38 and an enlarged end section 40. Mold 1 is then disassembled by removing end cap 34 (as illustrated) and separating cylindrical pressure bearing element tube 10 from mandrel 12. Green ceramic tubular form 36 is then removed from mandrel 12 for further processing such as by firing and sintering.

With additional reference to FIGS. 5 and 6, mold 1 can be reinforced to ensure cylindrical pressure bearing element 10 remains straight during molding by a steel reinforcing bar 42 of angle stock strapped to cylindrical pressure bearing element 10 by straps 44, preferably formed from a metal such as aluminum or steel.

Cylindrical pressure bearing element 10 is preferably made of a material, that for the given dimensions of cylindrical pressure bearing element 10, will result in a sufficient rigidity thereof that ceramic material 28 can be introduced into mold 1 (between cylindrical pressure bearing element 10 and mandrel 12) while cylindrical pressure bearing element 10 maintains its shape. In this regard, the concern here is to prevent wrinkling of cylindrical pressure bearing element 10 that could produce a hang up of ceramic material within the annular filling space formed between cylindrical pressure bearing element 10 and mandrel 12. Furthermore, such rigidity ensures that the transverse cross-section of such annular filling space will remain constant along the length of mold 1 so that the finished ceramic tube has a constant thickness. A further material consideration for cylindrical pressure bearing element 10 is that it must be sufficiently resilient to retract or equally pull away from the molded article to allow the finished green ceramic form to be removed from the mold after relaxation of hydrostatic pressure.

Preferably, cylindrical pressure bearing element 10 is fabricated from a material such as polyurethane with a hardness of 95A on the durometer scale. Hardnesses of between 75A and 75D on the durometer scale are also useful. Harder materials are preferred over softer materials because it has been found that ceramic materials tends not to adhere to harder materials.

As stated previously, the present invention is particularly useful in forming long thin ceramic tubes having lengths greater than about 60 mm and wall thicknesses in the order of about 1 mm. In order to form such ceramic tubes, cylindrical pressure bearing element 10 is provided with a length greater than bout 60 mm and mandrel 12 is sized slightly shorter to accommodate end cap 34. The inner diameter of cylindrical pressure bearing element 10 and the outer diameter of bar-like portion 22 of mandrel 12 are sized to produce a radial thickness within the resultant annular filling area of about 4 mm. As a general rule, such radial thickness should be no less than twice the desired thickness of compacted ceramic material.

By way of example, for a ceramic tube length greater than about 60 mm., an outer diameter of about 20 mm and a wall thickness of about 1 mm, formed of a ceramic material given above, mold 1 will be subjected to a pressure of about 275 Mpa (40 ksi) for about 5 minutes to produce the green ceramic tubular form such as 36.

As stated above, the present invention in further aspects concerns the formation of tubular structures with enlarged end sections for sealing purposes. The use of such a structure is shown in FIG. 7 which illustrates a joint assembly 2. Joint assembly 2 is designed to join a ceramic membrane 3 to a tube sheet 4. Ceramic membrane 3, produced by firing and sintering green ceramic tubular form 36, is provided with a closed end 46 and an enlarged end section 48. Joint assembly 2 consists of a fixture 50 connected to tube sheet 4 and a follower 52 having a hex-like head 54.

Follower 52 and its hex-like head 54 are provided with internal bores 56 and 58, respectively, that form an inner passage to allow a permeate stream produced within ceramic membrane 3 to flow through follower 52 and therefore joint assembly 2.

Follower 52 fits within a passageway 60 of fixture 50 and enlarged end section 48 of ceramic membrane 3*m* fits within a cylindrical pressure bearing element cavity 62 of follower 52 with the remainder of ceramic membrane 3 projecting from fixture 50. A threaded engagement 64 is provided between follower 52 and fixture 50 so that follower 52 is able to exert pressure against a rope seal 66 wrapped around enlarged head section 17 and against enlarged head section 48. Enlarged head section 48 in turn exerts pressure on a packing 68 situated between the undersurface of enlarged head section 48 and the end of passageway 60. In this regard, hex-like head 54 of follower 52 facilitates the exertion of torque upon follower 52 and therefore the pressure against rope seals 66 and 68 with a wrench or a like tool.

The pressure exerted upon rope seal 66 and packing 68 creates a seal between the lateral surface and undersurface of enlarged head section 48 and follower 52 to seal ceramic membrane 3 to fixture 50 and therefore tube sheet 4.

It is to be noted that fixture 50 and follower 52 can be fabricated from HAYNES 230 alloy. HAYNES 214 and INCOLOY 800 are other possible materials. The rope seals 48 and 50 can be formed of plied and twisted filaments of alumina-boriasilicate. Such filaments are sold commercially as NEXTEL 312 ceramic fibers as a product of 3M Ceramics Materials Department, 3M Center, St. Paul, Minn., 55144, United States. The particular rope-like material, described above, can be obtained in finished form from Coltronics Corp., Brooklyn, N.Y., United States, as item# CT301.

It should be further noted that although enlarged head section 17 is of cylindrical pressure bearing element configuration, other configurations are possible, for instance, flaired and other conical shapes. Further, although the seal is described with reference to a ceramic tube closed at one end, such sealing could be effectuated at opposite ends of a ceramic tube open at opposite ends.

An additional point is that although enlarged head section 48 is illustrated as having been formed in an elongated, thin-walled ceramic tube, the present invention also covers the formation of such enlarged head sections in shorter ceramic tubes such as can be formed by prior art isopressing techniques. In such case, the cylindrical pressure bearing element of the prior art mold is modified with an enlarged end section of the present invention. While such a cylindrical pressure bearing element is resilient in a radial direction, it is formed of a material that is not so rigid as to maintain its shape during filling and thus, long, thin tube-like elements are not possible.

While the present invention has been described with reference to a preferred embodiment, as will occur to those skilled in the art, numerous changes, additions and omissions may be made without departing from the spirit and scope of the present invention.

What is claimed is:

1. A cold isopressing method for compacting a granular ceramic material, said cold isopressing method comprising:

introducing said granular ceramic material into an isopressing mold having a cylindrical pressure bearing element and at least one mandrel located within said cylindrical pressure bearing element;

sealing said cylindrical pressure bearing element;

immersing said cylindrical pressure bearing element in a liquid and subjecting said cylindrical pressure bearing element to a hydrostatic pressure exerted through said liquid to compact said granular ceramic material; and relaxing said hydrostatic pressure;

the cylindrical pressure bearing element being sufficiently rigid so as to maintain its shape during the introducing of said granular ceramic material and sufficiently resilient in a radial direction thereof to deform and bear against said granular ceramic material upon the application of said hydrostatic pressure and to at least substantially return to its original shape upon the relaxation of said hydrostatic pressure, thereby to allow retraction of said cylindrical pressure bearing element from said granular ceramic material after compaction.

2. The isopressing method of claim 1, wherein said at least one mandrel is a single mandrel.

3. The method of claim 1 or claim 2, wherein:

said at least one mandrel is connected to an enlarged base element;

said enlarged base element projects into one end of said cylindrical pressure bearing element, thereby to seal said cylindrical pressure bearing element at said one end;

said granular ceramic material is introduced into said isopressing mold through the other end of said cylindrical pressure bearing element; and said cylindrical pressure bearing element is sealed by positioning a removable end plug within said other end of said cylindrical pressure bearing element.

4. The method of claim 1 or claim 2, wherein one end of said cylindrical pressure bearing element has an enlarged, axial end bore positioned so that said granular ceramic material after having been compacted has an enlarged end section.

5. The method of claim 1 or claim 2, wherein said mold is vibrated while said granular ceramic material is introduced into said isopressing mold.

6. The method of claim 2, wherein said cylindrical pressure bearing element is sized such that said granular ceramic material prior to compaction occupies an annular space having a wall thickness no less than about twice that of said granular ceramic material after compaction.

7. The method of claim 1 or claim 2, wherein said granular ceramic material contains a binder and said binder comprises no more than about 5% by weight of said granular ceramic material.

8. The method of claim 1 or claim 2, wherein said granular ceramic material is capable of conducting one of oxygen ions and hydrogen ions.

9. The method of claim 2, wherein said cylindrical pressure bearing element has a length of no less than about 60 millimeters and a diameter such that said granular ceramic material prior to compaction occupies an annular space having a radial thickness of no more than about 4 millimeters.

10. The method of claim 2, wherein said single mandrel is of cylindrical configuration.

11. An isopressing mold for compacting a granular ceramic material, said isopressing mold comprising:

a cylindrical pressure bearing element and at least one mandrel located within said cylindrical pressure bearing element;

the cylindrical pressure bearing element being sufficiently rigid so as to maintain its shape upon introduction of said granular ceramic material into said cylindrical pressure bearing element and sufficiently resilient in a radial direction thereof to deform and bear against said granular ceramic material upon an application of a hydrostatic pressure and to at least substantially return to its original shape upon the relaxation of said hydrostatic pressure, thereby to retract from said granular ceramic material after compaction thereof by said hydrostatic pressure; and means for sealing said cylindrical pressure bearing element at opposite ends thereof;

the cylindrical pressure bearing element and the sealing means being configured so that said cylindrical pressure bearing element and said sealing means are able to be immersed in a liquid for application of said hydrostatic pressure.

12. The isopressing mold of claim 11, wherein said at least one mandrel comprises a single mandrel.

13. The isopressing mold of claim 11 or claim 12, wherein said sealing means comprise:

an enlarged base element connected to said at least one mandrel and positioned within one end of said cylindrical pressure bearing element, thereby to seal said cylindrical pressure bearing element at said one end; and a removable end plug positioned within said other end of said cylindrical pressure bearing element.

14. The isopressing mold of claim 11 or claim 12, wherein one end of said cylindrical pressure bearing element has an enlarged, axial end bore positioned so that said granular ceramic material after having been compacted has an enlarged end section.

15. The isopressing mold of claim 12, wherein said cylindrical pressure bearing element is sized such that said granular ceramic material prior to compaction occupies an annular space having a wall thickness no less than about twice that of said granular ceramic material after compaction.

16. The isopressing mold of claim 11 or claim 12, further comprising a rigid support attached to said cylindrical pressure bearing element to ensure that said cylindrical pressure bearing element remains straight during mold filling with said granular ceramic material.

17. The isopressing mold of claim 11 or claim 12 wherein said material is polyurethane having a hardness of 95A on the durometer scale.

18. The isopressing mold of claim 12 wherein said cylindrical pressure bearing element has a length of no less than about 60 millimeters and a diameter such that said granular ceramic material prior to compaction occupies an annular space having a radial thickness of no more than about 4 millimeters.

19. The isopressing mold of claim 12 wherein said single mandrel is of cylindrical configuration.

20. A cold isopressing method for compacting a granular ceramic material into a green ceramic tubular form having an enlarged end section, said method comprising:

introducing said granular ceramic material into an isopressing mold having a cylindrical pressure bearing element and at least one mandrel located within said cylindrical pressure bearing element;

sealing said cylindrical pressure bearing element;

immersing said cylindrical pressure bearing element in water and subjecting said cylindrical pressure bearing element to a hydrostatic pressure exerted through said water to compact said granular ceramic material into said green ceramic tubular form; and relaxing said hydrostatic pressure;

said cylindrical pressure bearing element having an enlarged end bore to produce said enlarged end section of said green ceramic tubular form.

21. The method of claim 20, wherein said at least one mandrel comprises a single mandrel.

22. An isopressing mold for compacting a granular ceramic material into a green ceramic tubular form having an enlarged end section, said isopressing mold comprising:

a cylindrical pressure bearing element and at least one mandrel located within said cylindrical pressure bearing element;

the cylindrical pressure bearing element having an enlarged end bore to produce said enlarged end section within said green ceramic tubular form; and means for sealing said cylindrical pressure bearing element at opposite ends thereof;

the cylindrical pressure bearing element and the sealing means being configured so that said cylindrical pressure bearing element and said sealing means are able to be immersed in a liquid for application of said hydrostatic pressure.

23. The isopressing mold of claim 22, wherein said at least one mandrel comprises a single mandrel.

* * * * *